(12) United States Patent
Khalak et al.

(10) Patent No.: US 8,347,144 B2
(45) Date of Patent: Jan. 1, 2013

(54) FALSE ALARM MITIGATION

(75) Inventors: Asif Khalak, San Carlos, CA (US); Link Jaw, Scottsdale, AZ (US)

(73) Assignee: Scientific Monitoring Inc., Scottsdale, AZ (US)

( * ) Notice: Subject to any disclaimer, the term of this patent is extended or adjusted under 35 U.S.C. 154(b) by 164 days.

(21) Appl. No.: 12/802,704

(22) Filed: Jun. 11, 2010

(65) Prior Publication Data
US 2011/0307743 A1 Dec. 15, 2011

(51) Int. Cl.
*G06F 11/00* (2006.01)
(52) U.S. Cl. ........... 714/26; 714/39; 714/47.1; 714/47.2
(58) Field of Classification Search .................... 714/26, 714/39, 47.1, 47.2
See application file for complete search history.

(56) References Cited

U.S. PATENT DOCUMENTS

| | | | |
|---|---|---|---|
| 6,643,799 B1 * | 11/2003 | Bonissone et al. | 714/26 |
| 6,738,933 B2 * | 5/2004 | Fraenkel et al. | 714/47.2 |
| 6,892,163 B1 * | 5/2005 | Herzog et al. | 702/181 |
| 7,213,174 B2 * | 5/2007 | Dahlquist | 714/37 |
| 7,246,039 B2 * | 7/2007 | Moorhouse | 702/185 |
| 7,496,798 B2 | 2/2009 | Link et al. | |
| 7,529,974 B2 * | 5/2009 | Thibaux et al. | 714/26 |
| 7,761,765 B2 * | 7/2010 | Yuan et al. | 714/741 |
| 7,808,888 B2 * | 10/2010 | Kibel et al. | 370/216 |
| 8,015,139 B2 * | 9/2011 | Bahl et al. | 706/46 |
| 8,046,637 B2 * | 10/2011 | Gross et al. | 714/26 |
| 2003/0065986 A1 * | 4/2003 | Fraenkel et al. | 714/47 |
| 2004/0006398 A1 * | 1/2004 | Bickford | 700/30 |
| 2005/0169185 A1 * | 8/2005 | Qiu et al. | 370/241 |
| 2005/0204028 A1 * | 9/2005 | Bahl et al. | 709/223 |
| 2006/0188011 A1 * | 8/2006 | Goldszmidt et al. | 375/229 |
| 2007/0220368 A1 * | 9/2007 | Jaw et al. | 714/48 |
| 2008/0133288 A1 * | 6/2008 | Thibaux et al. | 705/7 |
| 2009/0031181 A1 * | 1/2009 | Yuan et al. | 714/741 |
| 2010/0050023 A1 * | 2/2010 | Scarpelli et al. | 714/46 |
| 2010/0100775 A1 * | 4/2010 | Slutsman et al. | 714/47 |
| 2010/0106462 A1 * | 4/2010 | Liu | 702/185 |
| 2011/0202227 A1 * | 8/2011 | Zhang et al. | 701/29 |
| 2011/0231704 A1 * | 9/2011 | Ge et al. | 714/26 |
| 2011/0239051 A1 * | 9/2011 | Basu et al. | 714/37 |

* cited by examiner

*Primary Examiner* — Joshua P Lottich
(74) *Attorney, Agent, or Firm* — The Halvorson Law Firm

(57) ABSTRACT

A method for reducing false alarms in a monitoring system comprising the steps of: providing an initial fault set (or a preliminary fault set) and using a decision process to successively reduce this initial fault set to a fault ensemble, said decision process using increasing probability or confidence in the initial fault set to generate the fault ensemble, which is considered to reflect a true abnormal condition; the decision process comprising at least two steps: the first step is generating a preliminary fault set by using a standard anomaly detection method with the additional variable (or adaptive) thresholds or temporal filters; the second step is using the preliminary fault set to generate at least one fault ensemble, each of which comprises a reduced number of refined faults that represent a more confident explanation of the cause(s) of an abnormal condition.

11 Claims, 3 Drawing Sheets

Branch-limiting heuristic reasoning logic

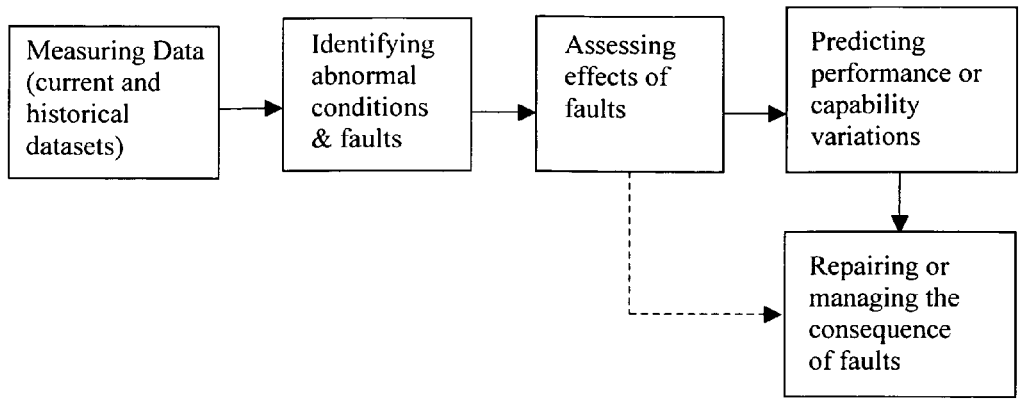
Figure 1: Process flow of a general health management method for industrial equipment
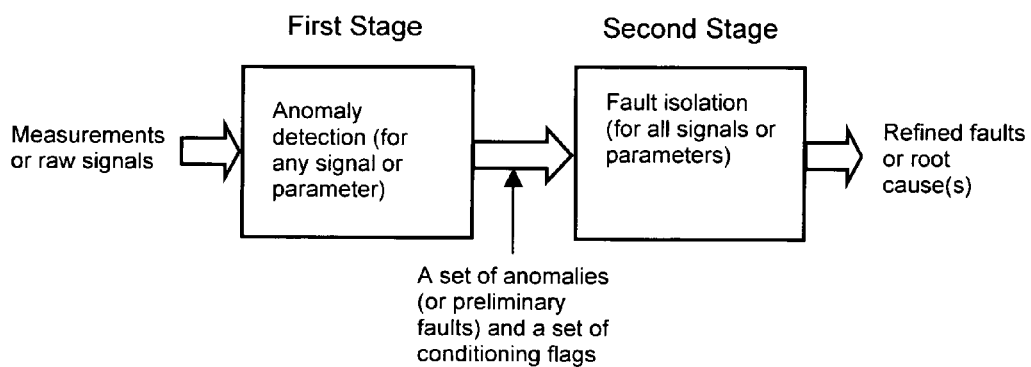
Figure 2: Two-stage process for reducing false alarms

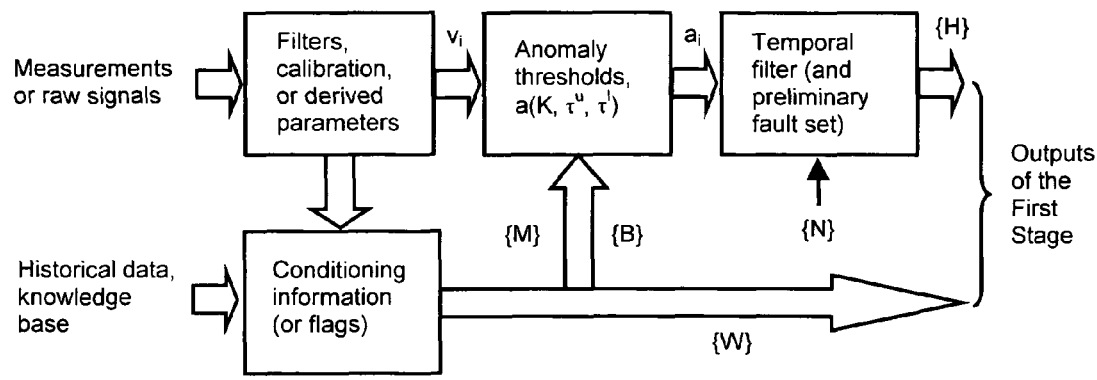
Figure 3: First-stage process diagram for reducing false alarms
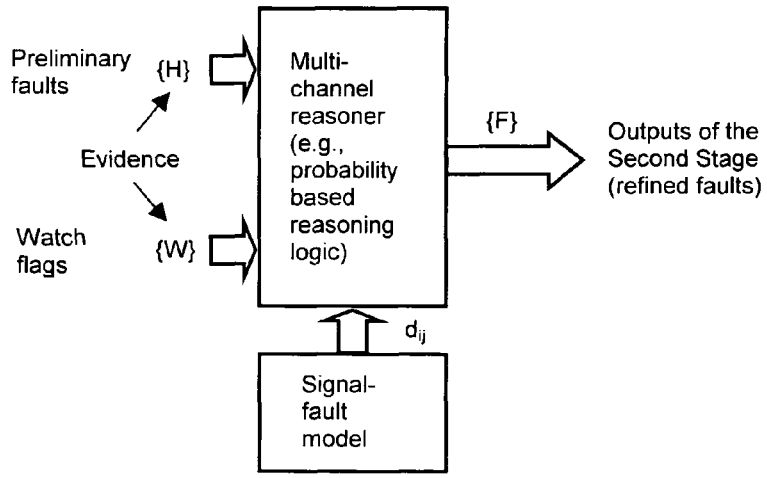
Figure 4: Second-stage process diagram for reducing false alarms

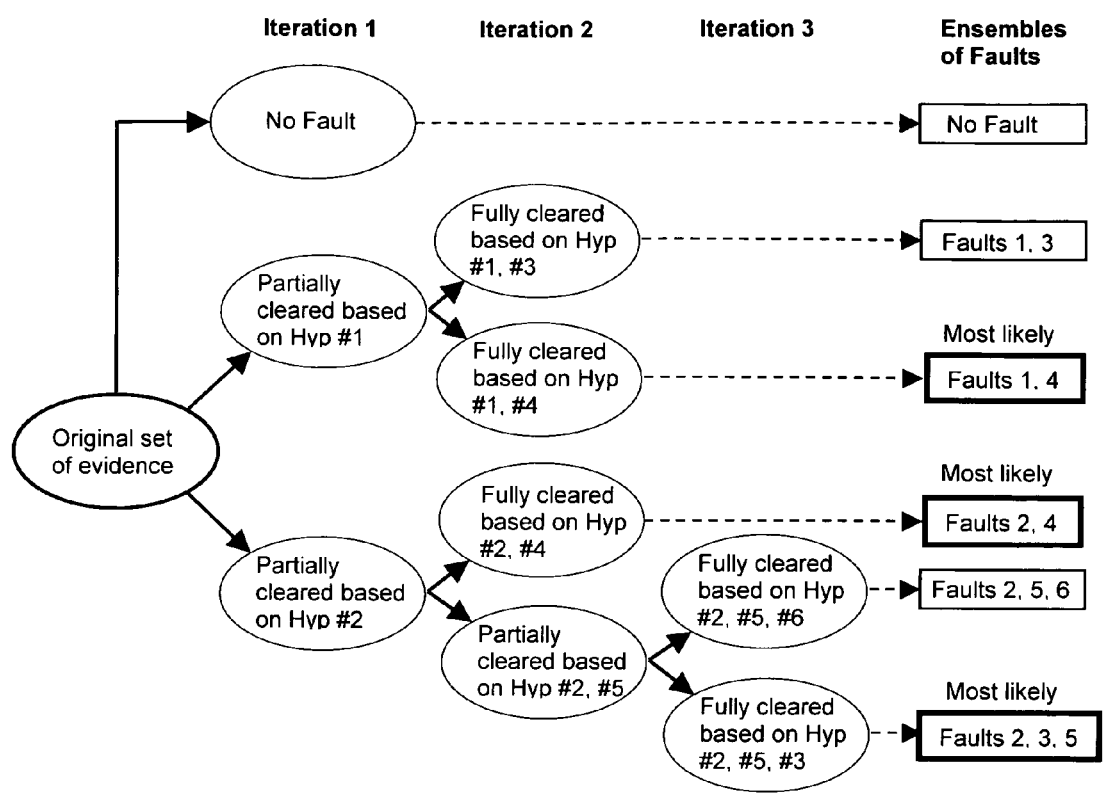
Figure 5: Branch-limiting heuristic reasoning logic

FALSE ALARM MITIGATION

This invention is made under a U.S. government sponsored Small Business Innovation Research (SBIR) project, entitled "False Alarm Mitigation" with the contract #FA8650-08-M-2882.

FIELD OF THE INVENTION

The present invention encompasses a monitoring method for a system and/or equipment. The method reduces false alarms in the diagnosis of system faults or failures.

BACKGROUND

Health management is a modern phrase for condition monitoring and maintenance management. Health management in the industrial equipment world typically involves a set of processes, hardware, and software tools that perform data analysis, diagnosis, assessment, prognosis, and decision-making. A health management system is sometimes called a condition monitoring system (CMS).

With the recent emphasis on prognostics, a health management system is also called a prognostics and health management (PHM) system; and in the context of equipment maintenance, it is called a condition based maintenance (CBM) system. The concept of a CBM system is to manage the consequence of a fault and perform maintenance, only if there is an evidence of need for repair or replacement. This concept is illustrated in FIG. 1.

The benefits of equipment health management are improved availability, increased efficiency, and reduced cost of ownership. To realize these benefits, the various health management functions, as illustrated in FIG. 1, must be efficiently integrated and timely updated with new information. Many monitoring techniques have been developed to facilitate CBM or PHM capability; however, most of these techniques suffer from the problem of frequent false alarms (or false positive diagnosis), because the equipment's operational data are noisy and the system being monitored is often complex. False alarms are undesirable because they waste human and facility resources in trying to analyze and troubleshoot the alarms, and these extra efforts often result in no-fault-found (NFF) or can-not-duplicate (CND).

Thus, there is a need to reduce false alarms in a condition monitoring or health management system. This need for more accurate monitoring of equipment condition is present not just for the aerospace industry, but is prevalent for other industries as well, including, but not limited to, sea and land transportation, process industry, manufacturing, and human health care.

SUMMARY OF INVENTION

The present invention is embodied in methods for reducing false alarms in equipment condition monitoring or health management. The methods provide a more integrated, automated approach to producing fewer and more accurate alarms while monitoring the operating condition of a piece of equipment or a system. The methods can also be applied to a broad range of monitoring applications and problems.

Monitoring is typically interested in the awareness of the condition, state, damage, performance, capability, or safety of a machine or a system. After an abnormal condition is "known," the interest is in how to manage the condition and what to do with the part that is at fault. As illustrated in FIG. 1, an integrated health management process involves the following five steps: 1) measuring key operating parameters of the system, 2) identifying one or more abnormal conditions as faults, 3) assessing the effects of each fault on system performance or capability, 4) predicting the variation or degradation in performance/capability for the future, and 5) repairing faulty parts and managing the consequence of faults. Steps 1-4 are monitoring functions, and step 5 is the management function.

This monitoring and management concept applies not just to machines or equipment, it can be applied to a wide range of "systems," such as monitoring and management of the performance of a vehicle, the performance of a computer software, the health of human bodies, or the performance of student's learning progress. For applications in different industries or scientific fields, different measurement devices and apparatuses may be used. For instance, displacement, speed, temperature, or pressure sensors may be used to measure the operating parameters of a machine; while temperature, pressure, oxygen, or heart beat sensors may be used to measure the parameters of a living body; moreover, tests, examinations, project assignments may be used to measure the performance of student's learning.

A general data-centric monitoring method for health management is the subject of an earlier invention, U.S. Pat. No. 7,496,798 B2, the contents of which are expressly incorporated herein by reference. The purpose of the present invention is to reduce the number of "false" alarms produced in a monitoring process, which is not limited to the method described in the above referenced invention.

The present method consists of two serial stages of information processing to draw conclusions: the first stage operates on sampled discrete-time, continuous-valued signals, and the second stage operates on discrete-valued signals. The two-stage processing method for reducing false alarms is illustrated in FIG. 2. Although the two stages are drawn as two separate blocks in FIG. 2, they can be combined into one "super" block when the invention is implemented in a computer system or in a monitoring software.

The purpose of the first stage is anomaly detection, and the purpose of the second stage is fault isolation so that the output of the second stage contains the most likely causes for the anomalies identified in the first stage, and the number of the causes is usually smaller than the number of anomalies detected in the first stage.

It is an object of the present invention to provide a method for reducing false alarms in a monitoring system, where the system can be a machine, a piece of equipment, a vehicle, a computer software, a human being, or an animal. The method relies on the measurements made in actual operating conditions to accomplish the purpose of monitoring.

It is another object of the present invention to identify abnormal conditions of the system to be monitored. These abnormal conditions are identified as anomalies.

It is yet another object of the present invention to reduce the number of anomalies (or a preliminary set of faults) to a smaller set containing the "refined" faults or "root-causes."

Although measurement methods and devices are not the subject of the present invention, the present invention assumes that measurements have been collected in the form of either isolated snapshots or continuous, repeated recording (that may or may not be periodic). Once a set of measurements is stored on a computer, it becomes a part of the "historical database" that contains the measurements of the system from the past, up to the most recent set of measurements. For clarity, the most recent set of measurements is called the "current data set" and the measurements are called "data."

Historical data may also contain information about faults, failures, repairs or cure/fix results.

The novel features that are considered characteristic of the invention are set forth with particularity in the appended claims. The invention itself, however, both as to its structure and its operation together with the additional object and advantages thereof will best be understood from the following description of the preferred embodiment of the present invention when read in conjunction with the accompanying drawings. Unless specifically noted, it is intended that the words and phrases in the specification and claims be given the ordinary and accustomed meaning to those of ordinary skill in the applicable art or arts. If any other meaning is intended, the specification will specifically state that a special meaning is being applied to a word or phrase. Likewise, the use of the words "function" or "means" in the Description of Preferred Embodiments is not intended to indicate a desire to invoke the special provision of 35 U.S.C. §112, paragraph 6 to define the invention. To the contrary, if the provisions of 35 U.S.C. §112, paragraph 6, are sought to be invoked to define the invention(s), the claims will specifically state the phrases "means for" or "step for" and a function, without also reciting in such phrases any structure, material, or act in support of the function. Even when the claims recite a "means for" or "step for" performing a function, if they also recite any structure, material or acts in support of that means of step, then the intention is not to invoke the provisions of 35 U.S.C. §112, paragraph 6. Moreover, even if the provisions of 35 U.S.C. §112, paragraph 6, are invoked to define the inventions, it is intended that the inventions not be limited only to the specific structure, material or acts that are described in the preferred embodiments, but in addition, include any and all structures, materials or acts that perform the claimed function, along with any and all known or later-developed equivalent structures, materials or acts for performing the claimed function.

BRIEF DESCRIPTION OF THE DRAWING

FIG. 1 shows the process flow of a health management method according to the present invention.

FIG. 2 shows the two-stage process of drawing conclusions in reducing false alarms according to the present invention.

FIG. 3 outlines the first-stage process in producing a set of anomalies (or preliminary faults) according to the present invention.

FIG. 4 outlines the second-stage process in producing a refined faults or root causes according to the present invention.

FIG. 5 outlines the branch-limiting heuristic reasoning logic according to the present invention.

DETAILED DESCRIPTION OF PREFERRED EMBODIMENTS

The present invention is concerned with a method for reducing false alarms produced in a monitoring or health management system.

Various sensors are attached to equipment or systems that are to be monitored. Measurements (or raw data) from these sensors are collected and converted into engineering units, the data are then validated and any noise is removed from the signal. These initial steps are considered sensory input processing and the result is a clearer "picture" of the actual operating condition of the system being monitored. After the sensory input data are processed, these data can be used with more confidence in other monitoring or health management functions.

Sensor input data are sometimes manipulated into derived parameters. One form of the derived parameters is a linear or nonlinear combination of different sensor inputs. Another form of the derived parameter is a performance or health measure (or index). Both the measured data and derived parameters can be further analyzed to detect any abnormal condition. An abnormal condition is the existence of one or multiple anomalies observed in these parameters (or signals).

The collection of these anomalies is called a preliminary fault set. The primary focus of the first stage process shown in FIG. 2 is to generate this fault set.

After the preliminary fault set is generated, a second-stage process is invoked to identify a refined set of faults which can better explain the root causes of an abnormal condition. This refined set depends on the assumptions and hypotheses used in the process, hence different refined fault sets can be identified for different hypotheses, and these refined fault sets are called fault ensembles.

The primary purpose of the second stage is to rank these fault ensembles according to their likelihood (or possibility) in representing a true abnormal condition.

Each anomaly, $a_i$, can be, although not always necessary, analyzed using a temporal filter to provide another path for smoothing the binary-valued anomaly $a_i$ in the time axis. The effect of a temporal filter depends on the length of the filtering time period and the specific algorithm used. A filter is typically characterized by a positive integer number to represent the number of data points in the filter for a specific anomaly. The collection of all of the filter lengths for all anomalies is called the length vector and denoted as $\{N\}$ in FIG. 3.

The output of the temporal filter is a flagged (or declared) fault. In case of no temporal filter, the anomaly ($a_i$) itself becomes a flagged fault. The set of all flagged faults is called the preliminary fault set, denoted as $\{H\}$ in FIG. 3. The preliminary fault set is an input to the second-stage analysis where the preliminary fault set is reduced to a smaller, more probable fault set, called the refined faults, denoted as $\{F\}$ in FIG. 4.

Additional information can be prepared to assists in the first or the second-stage of processing. This information is called conditioning information and falls into three categories: the first is to block (or disregard) some faults under certain conditions, the second is to watch (or influence the significance of) some faults under other conditions, and the third is to adjust a default detection threshold when necessary.

Conditioning information that is used to block faults is a set of blocker flags and denoted as $\{B\}$ in FIG. 3. Conditioning information that is used to influence faults is a set of watch flags and denoted as $\{W\}$ in FIG. 3. These two types of conditioning information or flags can be either a real-valued numbers to represent relative significance of a flag or simplified into binary-valued numbers ("1" or 0") to indicate when a flag is activated.

Conditioning information that is used to adjust thresholds is a set of modifiers and denoted as $\{M\}$ in FIG. 3. The modifiers can take on values of real numbers. A preferred method of using the conditioning information is shown in FIG. 3 and FIG. 4, where the modifiers and the blocker flags are used in the first stage and the watch flags are used in the second stage.

A preferred method of selecting the modifiers $\{M\}$ is an additive (or multiplicative) bias for the upper and the lower limiting values of each signal $v_i$ input to the anomaly threshold block in FIG. 3. Each bias is a function of the quality of the signal and the operating condition of the system. An example is to relax the limits when the noise in a signal is more probable and tighten the limits when the noise is less probable.

A preferred method of selecting the blocker flags {B} is to use binary values ("on" or "off") to identify the systems and their operating conditions where certain anomalies are expected to be enunciated, and they are triggered by "known" factors or causes.

A preferred method of selecting the watch flags {W} is also to use binary values to identify the systems and their operating conditions where certain anomalies are expected to be emphasized based on "known" factors or causes.

The output of the second-stage is one or multiple sets of root causes corresponding to different hypotheses. Each set of the root causes is refined from the preliminary fault set for a specific combination of hypotheses. Each refined set of root causes (or called a refined fault set) is a fault ensemble, and the collection of all possible fault ensembles is the output of the second stage. These fault ensembles are denoted as the set {F} in FIG. 4.

The step that converts the preliminary fault set to the refined fault set is a reasoner (or a decision engine), preferably it is a multi-channel reasoner or a multi-input reasoner. In the preferred embodiment of this invention, the algorithm used in the multi-channel reasoner is based on comparing the statistical probabilities of different decision outcomes and on selecting those outcomes that have higher probabilities (or eliminating those outcomes that have lower or small probabilities).

An outcome is a specific refined fault $f_j$ given the evidence {H, W}. The probability of this outcome is expressed by a conditional probability as $p(f_j|\{H,W\})$ Hence, the goal of the reasoner is to determine the most likely causes, or refined faults, given the evidence and under the applied hypotheses.

The probability of an outcome is calculated using a signal-fault model. This model provides a framework for estimating the probability of each possible outcome based on the evidence. A possible outcome after applying one (or an additional) hypothesis is a new most plausible fault that can explain the evidence better than without the hypothesis.

The reasoner also employs an iterative logic to reduce the preliminary fault set to a fault ensemble. In each iteration a new hypothesis is added and the iteration continues until the ultimate refined fault set explains all of the evidence throughout the history of iterations.

In the preferred embodiment, a branch-limiting heuristic logic is used and a maximum of two branches is allowed in each iteration. This logic starts with the original evidence set and applies the first two hypotheses to the evidence set as shown in the first two ovals in the column of Iteration 1 of FIG. 5. A probabilistic decision algorithm, such as a Naïve Bayesian Classifier, is used inside the oval to rank all potential faults. Then it limits the top 2 faults, designated as Fault 1 and Fault 2, in this first iteration and develops additional branches based on each additional hypothesis.

In a second iteration two more hypotheses, #3 and #4, are added to hypothesis #1 to form two separate hypothesis combinations: one is #1 and #3, and the other one is #1 and #4. The combination that can fully clear (or explain) the evidence set is selected as a refined fault set or a fault ensemble. If both combinations can explain the evidence, as is the case in the example of FIG. 5, then the outcomes from both combinations are saved as fault ensembles. Also in the second iteration, if hypotheses #2 and #4 can fully clear the evidence, then the outcome is also saved as a fault ensemble.

In the example of FIG. 5, the combination of hypotheses #2 and #3 does not explain the evidence, hence an additional hypothesis #5 is added to hypothesis #2 to form a new combination in the second branch of the outcome from hypothesis #2 in the first iteration.

This iteration and branching process continues for partially cleared evidence until all hypotheses have been evaluated in subsequent branches and all corresponding fault ensembles have been generated as in the right-most column of FIG. 5.

This reasoning process generates some finite number of fault ensembles which can all explain the evidence based on applicable hypotheses. Then a separate ranking algorithm can be applied to find the "most likely" ensembles, as shown by the blocks that are marked in bold contour lines and are immediately under the words "Most Likely" in the right-most column of FIG. 5.

The present invention improves upon the earlier invention in these five areas: 1) it uses a set of modifiers {M} to adjust the anomaly (or fault) detection thresholds, 2) it uses a temporal filter to reduce the sensitivity of the detected anomalies, $a_i$'s, 3) it uses a set of blocker flags {B} to disregard certain faults, 4) it uses a second-stage process that consists of a reasoner, preferably a multi-channel reasoner, to refine the fault set and reduce the number of false alarms, and 5) it uses a set of watch flags {W} to influence the decision process in the reasoner.

The preferred embodiment of the invention is described above in the Drawings and Description of Preferred Embodiments. While these descriptions directly describe the above embodiments, it is understood that those skilled in the art may conceive modifications and/or variations to the specific embodiments shown and described herein. Any such modifications or variations that fall within the purview of this description are intended to be included therein as well. Unless specifically noted, it is the intention of the inventor that the words and phrases in the specification and claims be given the ordinary and accustomed meanings to those of ordinary skill in the applicable art(s). The foregoing description of a preferred embodiment and best mode of the invention known to the applicant at the time of filing the application has been presented and is intended for the purposes of illustration and description. It is not intended to be exhaustive or to limit the invention to the precise form disclosed, and many modifications and variations are possible in the light of the above teachings. The embodiment was chosen and described in order to best explain the principles of the invention and its practical application and to enable others skilled in the art to best utilize the invention in various embodiments and with various modifications as are suited to the particular use contemplated.

What is claimed is:

1. A method for reducing false alarms in a monitoring system comprising the steps of:
   a) providing a raw data set;
   b) processing the raw data and deriving processing parameters including the step of filtering the raw data using a temporal filter;
   c) identifying anomalies in either the processed data or in the processing parameters, a preliminary fault set;
   d) using a decision process to successively reduce the preliminary fault set to at least one fault ensemble, said decision process using increasing probability or confidence in the preliminary fault set to generate the at least one fault ensemble, which is considered to reflect a true abnormal condition;
   e) ranking the at least one fault ensembles in order of decreasing likelihood to represent possible combinations for faults for a true abnormal condition.

2. The method according to claim 1 wherein the step processing the raw data and deriving processing parameters further comprises the step of filtering the raw data using conditioning information.

3. The method according to claim 2 wherein the conditioning information comprises blocker flags, modifiers and/or watch flags.

4. A method for reducing false alarms in a monitoring system comprising the steps of:
   a) providing a raw data set;
   b) processing the raw data and deriving processing parameters including the step of filtering the raw data using a temporal filter;
   c) identifying anomalies in either the processed data or in the processing parameters, a preliminary fault set;
   d) using a decision process to successively reduce the preliminary fault set to at least one fault ensemble, said decision process using increasing probability or confidence in the preliminary fault set to generate the at least one fault ensemble by comparing statistical probabilities of different decision outcomes and selecting those outcomes that have higher probabilities, which is considered to reflect a true abnormal condition;
   e) ranking the at least one fault ensembles in order of decreasing likelihood to represent possible combinations for faults for a true abnormal condition, wherein the statistical probability of a different decision outcome is expressed by a conditional probability, $p(f_j|\{H,W\})$, where $f_j$ is a specific refined fault, H is a preliminary fault set, and W are watch flags.

5. The method according to claim 4 wherein the statistical probability of a different decision outcome is calculated using a signal-fault model.

6. The method according to claim 5 wherein the statistical probabilities of different decision outcome are is calculated using a signal-fault model.

7. A method for reducing false alarms in a monitoring system comprising the steps of:
   a) providing a raw data set;
   b) processing the raw data and deriving processing parameters including the step of filtering the raw data using a temporal filter;
   c) identifying anomalies in either the processed data or in the processing parameters, a preliminary fault set;
   d) using a decision process to successively reduce the preliminary fault set to at least one fault ensemble, said decision process using increasing probability or confidence in the preliminary fault set to generate the at least one fault ensemble by comparing statistical probabilities of different decision outcomes and selecting those outcomes that have higher probabilities and employing an iterative logic to reduce the preliminary fault set to a fault ensemble, which is considered to reflect a true abnormal condition;
   e) ranking the at least one fault ensembles in order of decreasing likelihood to represent possible combinations for faults for a true abnormal condition,
wherein the step of employing an iterative logic to reduce the preliminary fault set to a fault ensemble uses a branch-limiting heuristic logic and a finite number of branches is allowed in each iteration.

8. The method according to claim 7 wherein the use of a branch-limiting heuristic logic and a finite number of branches is allowed in each iteration starts with the raw data set and the preliminary fault set, and applies one additional, distinct hypothesis to each of the finite number of branches.

9. The method according to claim 8 wherein the use of a branch-limiting heuristic logic and applying additional hypotheses is allowed in each iteration using a probabilistic decision algorithm to rank all potential fault sets, the potential fault sets are then limited to the top few fault sets whose number is the same as the number of branches in each iteration.

10. The method according to claim 9 wherein the use of branch-limiting logic and probabilistic decision ranking in each iteration is continued until all possible combinations of hypotheses have been covered in all possible iterations, and the collection of all possible faults in each series of branches is a fault ensemble.

11. The method according to claim 10 wherein a set of fault ensembles is identified for all possible branch series and each of these fault ensembles corresponds to a probability or likelihood in explaining the root causes of the true anomaly, and these fault ensembles are ranked according to these probabilities to select the top X number of most likely fault ensembles or root causes, wherein X is an integer number selected by a user.

* * * * *